3,119,656
PREPARATION OF TRIVALENT TITANIUM SALTS
Edgel P. Stambaugh, Columbus, and Raymond A. Foos, Loveland, Ohio, assignors to National Distillers and Chemical Corporation, New York, N.Y., a corporation of Virginia
No Drawing. Filed June 6, 1960, Ser. No. 33,916
13 Claims. (Cl. 23—87)

This invention relates to a new and improved process for the preparation of titanium salts. More particularly, the invention pertains to the preparation of trivalent titanium salts.

Subvalent titanium compounds, and particularly acidic salt solutions thereof, have found use as strong reducing agents. For example, they are used to effect the reduction of ferric halides to ferrous halides, hydroxylamine to ammonia, nitro compounds to amines, acid fast dyestuff to leuco bases, and the like. Heretofore the trivalent titanium compounds, and aqueous solutions thereof, generally have been prepared by such means as electrolytic reduction or zinc reduction of aqueous solutions of titanium oxychloride. High temperature aluminum, titanium or hydrogen reduction of titanium tetrahalides is also known to prepare anhydrous titanium trihalides. Aqueous solutions containing trivalent titanium can be prepared by dissolution in mineral acids. These resulting aqueous solutions may also be employed as reducing agents in the paper industry.

One object of this invention is to provide a novel process for the preparation of trivalent titanium compounds which does not require either the expensive apparatus or reductants employed in the prior art processes. Another object of the invention is to provide a direct process for the preparation of trivalent titanium acid salt solutions from a commercially available and low cost raw material. A further object of the invention is to provide a method for isolating air-stable trivalent titanium salts from aqueous solutions. These and other objects of the invention will become apparent from the ensuing description.

In accordance with this invention, it has now been found that trivalent titanium acidic salt solutions can readily be prepared by reacting titanium cyanonitride with mineral acids. The resulting reaction product mixture is filtered to remove unreacted titanium cyanonitride and insoluble by-products and the filtrate will contain the trivalent titanium salt. In general it is preferred to carry out the reaction under non-oxidizing conditions to obtain maximum yields of trivalent titanium; however, trivalent titanium can be prepared even under atmospheric conditions. Non-oxidizing conditions may be accomplished by maintaining a blanket of an inert gas such as nitrogen, argon, carbon monoxide, etc. over the hot reactants. A vacuum could also be used to attain a non-oxidizing operating condition.

The use of ground titanium cyanonitride is preferred in order to facilitate the reaction. An average particle size of less than about minus 100 mesh may be employed. However, the use of finely ground, i.e., less than about minus 325 mesh, is especially preferred, since the titanium cyanonitride will react almost instantaneously with the mineral acid under the preferred operating conditions of this invention.

Mineral acids, such as hydrochloric acid, sulfuric acid, mixtures thereof, etc. are employed in the reaction. It is preferred to employ concentrated mineral acid solutions in order to facilitate the reaction and to obtain high yields of the trivalent titanium salt. With sulfuric acid the concentration of the aqueous acid feed may vary from about 100 to 1830 grams per liter, and preferably about 1200 to 1800 grams per liter. With hydrochloric acid, on the other hand, concentrations will range from about 100 to 400 grams per liter, and preferably about 150 to 250 grams per liter. For the purposes of this invention, the use of either sulfuric or hydrochloric acid is preferred.

The temperature at which reaction is carried out will be within the range of about 70° to 400° C., and preferably about 110° to 250° C. However, it will be understood that the even higher temperatures may be employed without departing from the broader aspects of this invention. Reaction time may also vary over a wide range, and it is obvious that the exact time period will depend upon such factors as temperature, acid concentration, and particle size. In general, the reaction will be carried out for about 10 minutes to 6 hours or more.

In practicing the method of this invention, ground titanium cyanonitride is mixed with the mineral acid, and the resulting mixture heated to the desired reaction temperature. It is also possible to preheat the acid to a temperature within the range of about 70° to 400° C. and then add the ground titanium cyanonitride. After the reaction is completed, the resulting reaction product mixture is cooled to a temperature of about 10° to 100° C., and preferably about 40° to 60° C. The cooled product mixture is then filtered, utilizing conventional equipment, to remove unreacted titanium cyanonitride and any insoluble by-products which may form. The filtrate contains the trivalent titanium salt, excess mineral acid, and water. The filter cake may be washed with water or a dilute, aqueous mineral acid solution containing about 0% to 10% mineral acid to remove any remaining trivalent titanium salt. If the filtrates are combined, the use of the same mineral acid for the reaction and the leaching steps is preferred.

A trivalent titanium sulfate salt prepared as described above was recovered from the filtrate by heating at temperatures within the range of about 70° to 110° C. under vacuum. The purple powder so recovered was found to comprise $[Ti_2(SO_4)_3][H_2SO_4]_{1.5-2.0}[H_2O]_{6-8}$, and it was stable for an indefinite period of time under atmospheric conditions.

When concentrated mineral acid is employed in the process of this invention, the reaction product mixture is apt to be pasty and difficult to treat as such for the recovery of the trivalent titanium salt. It has been found, however, that additional water may be added to the reaction product mixture. The resulting mixture is then heated to a temperature within the range of about 30° to 100° C., and preferably about 40° to 60° C., to effect dissolution of substantially all of the trivalent titanium salt. Filtration is carried out to remove unreacted titanium cyanonitride and insoluble by-products, if any. The amount of water used in this step may, of course, vary over a wide range. Nevertheless, it is preferred to employ at least enough water to solubilize substantially all of the trivalent titanium salt product.

The invention will be more fully understood by reference to the following illustrative examples.

*Example I*

About 445 ml. of concentrated sulfuric acid was heated to a temperature of about 100° to 125° C., and 200 grams of titanium cyanonitride (minus 325 mesh) was added slowly to the heated sulfuric acid to maintain a reaction temperature within the range of about 200° to 225° C. The reaction mixture was cured for about 2.5 hours and then cooled to 50° C. Approximately 1000 ml. of water was next added to the pastelike product and dissolution of soluble material was effected by heating at 50° to 60° C. for about 2 hours. The resulting slurry was filtered to remove insoluble material. The recovered purple filtrate was analyzed to determine the percentages of total and trivalent titanium present. Based on total titanium in the filtrate (166 g.p.l. expressed as $TiO_2$), about 33.1% trivalent titanium was found with a total titanium solubilization of 87%. Some loss of trivalent titanium resulted because of the oxidation which occurred by carrying out the reaction and recovery steps under atmospheric conditions.

*Example II*

One liter of a 20% hydrochloric acid (518 ml. of 37% hydrochloric acid diluted to one liter with water) solution was heated to its boiling temperature and 500 grams of minus 325 mesh titanium cyanonitride added in 100 gram increments. After refluxing for 6 hours, the purple solution was allowed to stand for 40 hours. Filtration of the slurry followed by analysis showed that 95% of the solubilized titanium (27.6 g.p.l. expressed as $TiO_2$) was in the trivalent form. A nitrogen blanket was maintained over the hot slurry to minimize oxidation of the trivalent titanium to the tetravalent form.

*Example III*

575 ml. of 50% sulfuric acid was heated to 100° C. and 100 grams of minus 100 mesh titanium cyanonitride slowly added. The slurry temperature was maintained at 122° C. for 30 minutes. The resulting reaction product mixture was cooled to room temperature, diluted to 1000 ml. with water, and filtered. Analysis of the purple filtrate (8.1 g.p.l. titanium expressed as $TiO_2$) showed 96% of the titanium to be in the trivalent state. As in Example II, a nitrogen pad was applied during dissolution to minimize oxidation of the titanium.

The above data show that the process of this invention is effective for the production of trivalent titanium salts directly from titanium cyanonitride. It is also apparent that the process does not require the use of expensive reagents or equipment. In addition, outstanding yields of trivalent titanium can be recovered by employing the preferred operating conditions.

In accordance with another aspect of this invention, a stable trivalent titanium salt can be recovered from the filtrate by the addition of a partially or completely miscible polar organic solvent. The organic solvent may be a ketone, aldehyde, alcohol, or the like. Illustrative solvents are as follows: acetone, methyl ketone, propyl alcohol, isopropyl alcohol, ethanol, acetaldehyde, etc. For example, acetone was added to an aqueous solution containing trivalent titanium sulfate and sulfuric acid in the proportions of 10 parts by volume of acetone for each part of the aqueous solution. Precipitation of the trivalent titanium sulfate occurred at room temperature, and the precipitate was recovered by conventional filtration techniques. The precipitate was found to be composed of greater than 90% titanium in the trivalent state and was stable for an indefinite period of time at room temperature and while exposed to atmospheric conditions. The acetone can be recovered and reused in subsequent precipitation operations. The sulfuric acid solution may also be recovered and reconcentrated for use in the reaction step.

While particular embodiments of this invention are shown above, it will be understood that the invention is obviously subject to variations and modifications without departing from its broader aspects.

What is claimed is:

1. A process for preparing a trivalent titanium salt which comprises reacting titanium cyanonitride with a non-oxidizing mineral acid under non-oxidizing conditions at a temperature within the range of about 70° C. to 400° C. for at least ten minutes to obtain a solution containing said trivalent titanium salt and solid material, and separating the solution containing said trivalent titanium salt from the solid material.

2. The process of claim 1 wherein said mineral acid is selected from the group consisting of sulfuric acid, hydrochloric acid, and mixtures thereof.

3. A process for preparing trivalent titanium sulfate which comprises reacting ground titanium cyanonitride with sulfuric acid under non-oxidizing conditions and at a temperature within the range of about 70° to 400° C. for at least ten minutes to obtain a reaction product mixture comprising a solution containing said trivalent titanium sulfate and solid material, and filtering to separate the solution containing said trivalent titanium sulfate from the solid material.

4. The process of claim 3 wherein said titanium cyanonitride has an average particle size of less than about minus 325 mesh.

5. The process of claim 3 wherein said sulfuric acid is concentrated and wherein water is added to the reaction product mixture, and the resulting mixture is heated to a temperature within the range of about 30° to 100° C. to effect dissolution of said trivalent titanium sulfate.

6. The process of claim 3 wherein said reaction is carried out in the presence of an inert gas.

7. The process of claim 6 wherein said inert gas is nitrogen.

8. The process of claim 3 wherein a miscible, polar, organic solvent is added to the solution containing said trivalent titanium sulfate, and the trivalent titanium sulfate is precipitated and recovered.

9. The process of claim 8 wherein said organic solvent is acetone.

10. A process for preparing trivalent titanium chloride which comprises reacting ground titanium cyanonitride with hydrochloric acid under non-oxidizing conditions and at a temperature within the range of about 110° to 250° C. for at least ten minutes to obtain a reaction product mixture comprising a solution containing said trivalent titanium chloride and solid material, cooling the reaction product mixture to about 10° to 100° C., and then filtering to separate the solution containing said trivalent titanium chloride from the solid material.

11. The process of claim 10 wherein said titanium cyanonitride has an average particle size of less than about minus 325 mesh.

12. The process of claim 10 wherein said hydrochloric acid is concentrated and wherein water is added to the reaction product mixture, and the resulting mixture is heated to a temperature within the range of about 30° to 100° C. to effect dissolution of said trivalent titanium chloride.

13. The process of claim 10 wherein said reaction is carried out in the presence of an inert gas.

References Cited in the file of this patent

UNITED STATES PATENTS

| | | |
|---|---|---|
| 1,783,684 | Von Bichowsky | Dec. 2, 1930 |
| 2,486,912 | Belchetz | Nov. 1, 1949 |
| 2,576,483 | Schultz | Nov. 27, 1951 |
| 2,829,948 | McCord | Apr. 8, 1958 |

OTHER REFERENCES

Barksdale: "Titanium," pages 91 and 92. The Ronald Press, New York.